(12) United States Patent
Reed et al.

(10) Patent No.: US 11,093,320 B2
(45) Date of Patent: Aug. 17, 2021

(54) ANALYSIS FACILITATOR

(71) Applicant: International Business Machines Corporation, Armonk, NY (US)

(72) Inventors: David C. Reed, Tucson, AZ (US); Becky Enderle, Tucson, AZ (US); Theresa Mary Brown, Tucson, AZ (US); Christina Lara, Tucson, AZ (US); Rubi Roxana Ballesteros, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 16/537,857

(22) Filed: Aug. 12, 2019

(65) Prior Publication Data

US 2021/0049063 A1    Feb. 18, 2021

(51) Int. Cl.
*G06F 11/07*    (2006.01)
*G06N 20/00*    (2019.01)

(52) U.S. Cl.
CPC ...... *G06F 11/0793* (2013.01); *G06F 11/0709* (2013.01); *G06F 11/079* (2013.01); *G06F 11/0751* (2013.01); *G06N 20/00* (2019.01)

(58) Field of Classification Search
CPC ............. G06F 11/0793; G06F 11/0709; G06F 11/0751; G06F 11/079; G06N 20/00
See application file for complete search history.

(56) References Cited

U.S. PATENT DOCUMENTS

| | | | | |
|---|---|---|---|---|
| 7,409,318 | B2 * | 8/2008 | Dulberg | G06F 11/0748 702/182 |
| 8,327,189 | B1 * | 12/2012 | Glade | G06F 11/079 714/26 |
| 9,672,497 | B1 | 6/2017 | Lewis et al. | |

(Continued)

OTHER PUBLICATIONS

Tierney et al., "Instantiating a global network measurement framework", Lawrence Berkeley National Laboratory, Publication Date Feb. 3, 2009, 11 pages.

(Continued)

*Primary Examiner* — Nadeem Iqbal
(74) *Attorney, Agent, or Firm* — Stosch Sabo

(57) ABSTRACT

Described herein are techniques for diagnostic analysis in computational systems. The techniques including a method comprising receiving error documentation related to a system having a plurality of hardware components and a plurality of software components, where the error documentation is received from a user device associated with a user profile having permissions. The method further comprises generating a diagnostic plan including a diagnostic tool based on the error documentation. The method further comprises implementing the diagnostic tool on at least one component selected from a group consisting of: the plurality of hardware components, and the plurality of software components. The method further comprises receiving censored diagnostic output in response to implementing the diagnostic tool, where the censored diagnostic output is censored according to the defined permissions of the user (Continued)

profile. The method further comprises generating an error resolution plan based on the censored diagnostic output and the error documentation.

20 Claims, 9 Drawing Sheets

(56) References Cited

U.S. PATENT DOCUMENTS

| | | | |
|---|---|---|---|
| 10,157,347 B1 | 12/2018 | Kasturi et al. | |
| 2009/0228950 A1 | 9/2009 | Reed et al. | |
| 2009/0300423 A1 | 12/2009 | Ferris | |
| 2017/0372226 A1* | 12/2017 | Costa | G06N 20/00 |
| 2019/0171552 A1* | 6/2019 | Mitchell | G06F 11/3672 |

OTHER PUBLICATIONS

Tantatsanawong et al., "Multi-domain Healthcare Services in Thailand via Future Internet", 2011 Annual SRII Global Conference, IEEE Computer Society, pp. 98-104.
Duarte et al., "Collaborative Fault Diagnosis in Grids through Automated Tests", 20th International Conference on Advanced Information Networking and Applications—vol. 1, IEEE, 2006, 15 pages.
Gopalakrishnan, A., "Network and Middleware Security for Enterprise Network Monitoring", Presented in Partial Fulllment of the Requirements for the Degree Master of Science in the Graduate School of The Ohio State University, 2012, 65 pages.
Doviello et al., "Bridging Network Monitoring and the Grid", CESNET Conference, 2006, 15 pages.
Mell et al., "The NIST Definition of Cloud Computing", Recommendations of the National Institute of Standards and Technology, Sep. 2011, 7 pages.

* cited by examiner

ANALYSIS FACILITATOR

BACKGROUND

The present disclosure relates to system diagnostics, and, more specifically, to an analysis facilitator for resolving errors in complex systems.

The increasingly complex and interrelated nature of computer components, computer systems, computer networks, computer applications, management software, and networking software increases the difficulty in identifying root causes of system errors and resolving those system errors expediently. In addition to the variety of types of interconnected components, these interconnected components are often provided by different vendors. Interconnecting different components from different vendors introduces further diagnostic challenges insofar as such components can be associated with unique troubleshooting procedures, specific diagnostic tools generating vendor-specific feedback, and/or sensitive information that varies from component to component and vendor to vendor.

SUMMARY

Aspects of the present disclosure are directed toward a computer-implemented method comprising receiving error documentation related to a system having a plurality of hardware components and a plurality of software components, where the error documentation is received from a user device associated with a user profile, the user profile having permissions. The method further comprises generating a diagnostic plan including a diagnostic tool based on the error documentation. The method further comprises implementing the diagnostic tool on at least one component selected from a group consisting of: the plurality of hardware components, and the plurality of software components. The method further comprises receiving censored diagnostic output in response to implementing the diagnostic tool, where the censored diagnostic output is censored according to the defined permissions of the user profile. The method further comprises generating an error resolution plan based on the censored diagnostic output and the error documentation.

Additional aspects of the present disclosure are directed to systems and computer program products configured to perform the method described above. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
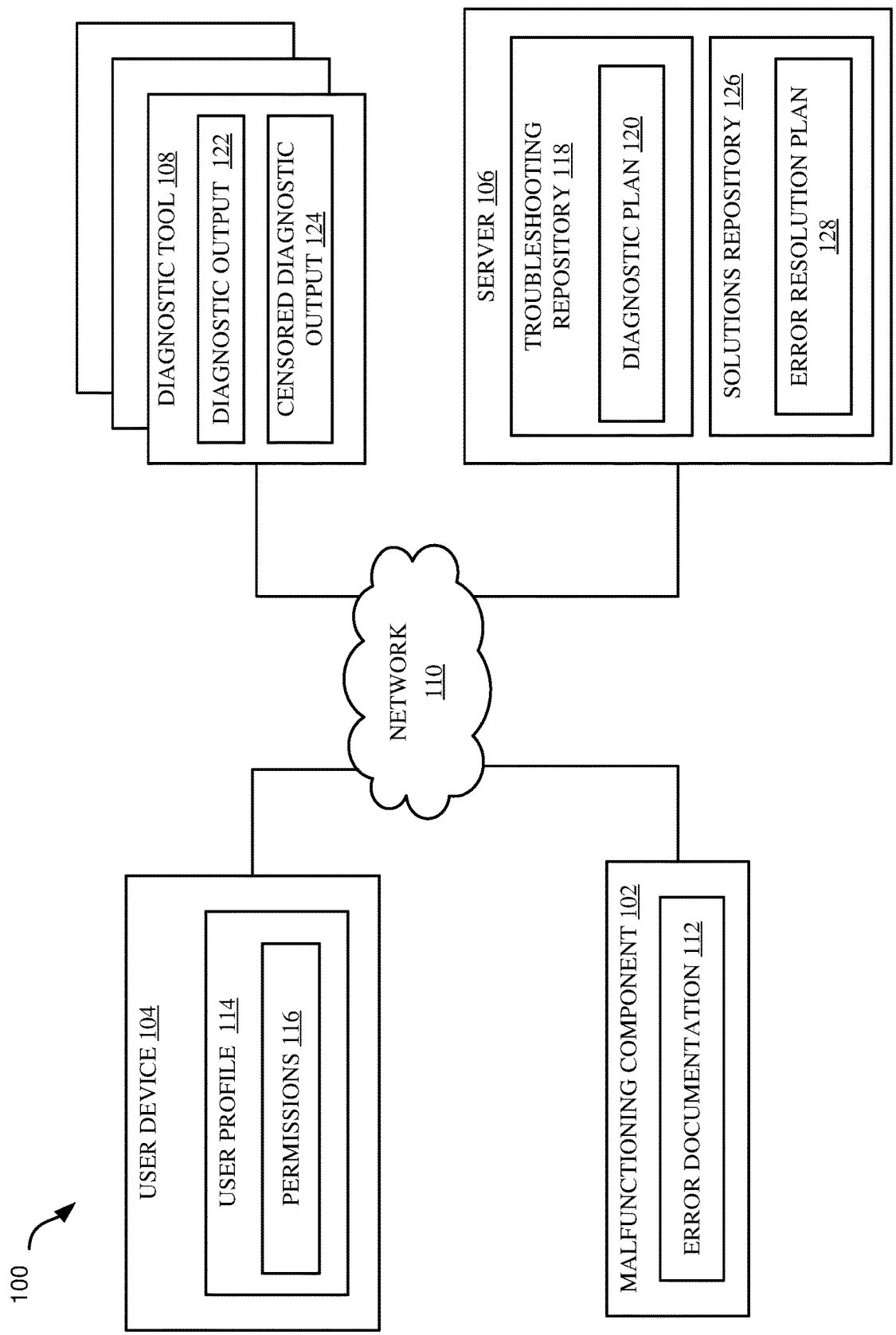
FIG. 1 illustrates a block diagram of an example computing environment for resolving system errors, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward system diagnostics, and, more specifically, to an analysis facilitator for resolving errors in a complex system. While not limited to such applications, embodiments of the present disclosure may be better understood in light of the aforementioned context.

Currently, when problems arise on complex systems, multiple experts from different areas and/or different companies may be required to perform diagnostic analyses on their respective components of the system. Each of those components may be associated with different diagnostic procedures requiring different diagnostic tools which generate different types of documentation. Further, these siloed troubleshooting teams may not share information with one another, thereby further lengthening the error resolution process. As an example, an error resolution analysis may begin at one component, and, as the error resolution analysis progresses, additional information may be required from other components. Traditionally, to acquire the information from the other components, an expert from a company associated with the other component must be engaged to retrieve the appropriate information and transfer that information to the interested party. In some instances, this needed information is as simple as a device number associated with an error event or a vendor-specific meaning of a certain error code.

To resolve the complex, time-consuming process typically employed to diagnose and resolve complex system errors, aspects of the present disclosure are directed to an analysis facilitator application that can compile and execute diagnostic tools and procedures for the separate components making up a complex system. Advantageously, aspects of the present disclosure overcome numerous technical challenges related to compiling and executing diagnostic tools and procedures for numerous components from numerous vendors.

A first challenge relates to the complexity of current computational systems. For example, numerous experts may be required to correctly resolve an interrelated technical error that is causing poor performance on numerous components of a system as a result of the particular configuration of the system. In other words, any single person may have inadequate technical training and/or resources to resolve problems arising in complex computational systems. Advantageously, aspects of the present disclosure utilize one or more of database matching, machine learning, and/or natural language processing (NLP) to collect a large amount of information from a variety of disparate sources (e.g., vendor-specific manuals, component best practices, third-party diagnostic tools, etc.), automatically organize and analyze the collected information to generate one or more rules, models, or hierarchies, and apply the generated rules, models, or hierarchies to error patterns in real-time to identify accurate root causes and generate solutions with a high probability of success.

A second challenge relates to the proprietary nature of various hardware and software components in current computational systems. For example, different vendors provide different hardware and software components in a complex computational system. Each of these vendors may be sensitive to diagnostic data being collected and/or viewed by people outside of the company providing the various hardware and software components. For example, companies may fear reverse engineering of their products, publication of performance data of their products, transgressing privacy laws or export controls, and the like. Advantageously, aspects of the present disclosure are configured to censor portions of diagnostic output data retrieved as a result of implementing various diagnostic tools associated with the analysis facilitator. Diagnostic output data can be censored according to predefined permissions associated with user profiles executing the analysis facilitator functionality.

A third technical challenge relates to usability. Advantageously, aspects of the present disclosure can provide a step-by-step diagnostic plan and/or error resolution plan guiding a user through troubleshooting steps and error resolution steps. Further, any data collected is automatically censored according to permissions contained in a user profile. Finally, aspects of the present disclosure can be provisioned from a remote data processing system (e.g., a cloud server) to a user device (e.g., a tablet) hosting an analysis facilitator. This provisioning arrangement enables the user to receive the most updated diagnostic plans and error resolution plans available (e.g., as opposed to running an outdated version of the analysis facilitator on a stand-alone device).

Thus, aspects of the present disclosure generally realize advantages related to (1) improved collection and analysis of data resulting in faster and more accurate determinations of root causes and expedient solutions for resolving the identified root causes; (2) improved security related to censoring certain diagnostic outputs to protect proprietary, trade secret, confidential, private, export-controlled, or otherwise sensitive information; and/or (3) improved usability related to a single application providing coordinated usage of various diagnostic tools and/or diagnostic procedures for a variety of components from a variety of vendors. The aforementioned advantages are example advantages, and embodiments of the present disclosure can exist that realize all, some, or none of the aforementioned advantages while remaining within the spirit and scope of the present disclosure.

In the interest of further clarifying some aspects of the present disclosure, various non-limiting examples are now provided. A first non-limiting example is as follows: a software command to use encryption is sent to storage hardware. The software command is unsuccessful, and an error is reported back from the hardware to a software host. The software host then returns the Input/Output (I/O) failure and the application write attempt receives an error. A software support engineer is contacted to determine why the application write attempt failed. The software support engineer analyzes the command software sent to the hardware (which seems to be correct). However, the software support engineer notices that the appropriate feature code does not seem to be turned on in the client's hardware. Traditionally, the software engineer would contact a hardware engineer to assist with the diagnostics. However, using aspects of the present disclosure, the software support engineer instead utilizes the analysis facilitator application and chooses a storage hardware option from the component selection menu. Information regarding the name/location of the client's hardware is entered by the software support engineer along with selecting an option to "analyze if the correct level of microcode is installed on the hardware to support encryption." The analysis facilitator then invokes the corresponding hardware support tool which is executed to determine the microcode level from the client's hardware and returns that microcode level information. The software support engineer is then able to inform the client that the reason for the failure is that a storage controller of the client's hardware does not have the appropriate microcode level to support the encryption feature.

A second non-limiting example is as follows: a hardware problem is triggered because storage was exhausted on thinly provisioned volumes. The hardware engineer analyzing the issue suspects that the clients received alerts on their host system log notifying them that the backend storage was below a threshold level. Normally, the hardware engineer would contact a software engineer to analyze the software logs to provide information regarding those alerts. Instead, with the analysis facilitator, the hardware engineer is able to enter the name of the system log that the client supplied along with information about the system that was sent to the client and select the type of information that the hardware engineer wants to identify in the system logs. A corresponding log formatter is then invoked, and all of the alert messages are returned to the hardware engineer along with the times when they were issued. The hardware engineer is then able to provide the client with details regarding the alerts without having to contact the software engineer.

A third non-limiting example is as follows: the analysis facilitator is made available to external clients. When users sign-in to use the analysis facilitator, their authentication determines the level of details they are provided from data extraction. A client who receives an I/O error may enter the error data received in the I/O error message into the analysis facilitator for the description of the error data. The tool is invoked to provide the definition and break down the error data for external client view. The level of detail provided in this case is a high-level description of the error code with no proprietary information provided. If the user of the analysis facilitator was user with a higher level of authorization, the description of the error data may have gone into greater detail. Controlling the level of diagnostic information on a user-by-user basis can allow for clients that have purchased, for example, programming specifications to receive a customized amount of detail. Controlling the level of diagnostic information on a user-by-user basis can also limit the amount of information returned based on legal requirements of certain geographies where export controls may limit disclosure of certain types of information. Controlling the level of diagnostic information on a user-by-user basis can further allow for support teams to cross company boundaries and see non-proprietary views of diagnostic data without having to contact that company's support team directly.

Referring now to FIG. 1, illustrated is an example computing environment 100 for implementing facilitator analysis functionality. FIG. 1 includes a malfunctioning component 102, a user device 104, a server 106, and a diagnostic tool 108 communicatively coupled to one another by network 110.

Malfunctioning component 102 can be a hardware component, a software component, or a combination of hardware and software components. Malfunctioning component 102 can be an individual module of a system, a subsystem, or a system, according to various embodiments. Malfunctioning component 102 can be, but is not limited to, a processor, a computer, a motherboard, a bus, a disk drive, a flash storage device, a tape drive, a monitor or interface, a auxiliary component (e.g., keyboard, pointer, microphone, speaker, etc.), a server, a storage controller, a router, a network interface, a device interface, an application, firmware, software, an operating system (OS), a Basic Input/Output System (BIOS), file management utilities, device drivers, plugins, a disk operating system (DOS), and/or other components that exist within a complex computational system.

Malfunctioning component 102 can include error documentation 112 related to an error associated with malfunctioning component 102. Error documentation 112 can be in the form of, for example, an error code, an error message, a malfunction indicator, a logfile, a complaint received from a client, or the like. Error documentation 112 can be related to software errors such as, for example, drivers, firmware, software, operating systems, applications, communication protocols, and so on. Further, error documentation 112 can be related to hardware errors such as, for example, computer errors, processor errors, storage volume errors, router errors, and/or other hardware errors.

User device 104 can retrieve error documentation 112 from the malfunctioning component 102. As one example, the malfunctioning component 102 can automatically send the error documentation 112 to the user device. As another example, the user device 104 can input a command to malfunctioning component 102 resulting in the malfunctioning component 102 providing the error documentation 112 to the user device 104.

User device 104 can be, but is not limited to, a desktop, a laptop, a tablet, a smartphone, or another user device, now known or later developed. User device 104 is associated with a user profile 114, where the user profile 114 is associated with various permissions 116. Permissions 116 can define informational permissions and executable permissions. For example, permissions 116 can define information (e.g., proprietary information, trade secret information, customer/client information, etc.) that user profile 114 can and cannot see. Likewise, permissions 116 can define corrective actions that the user profile 114 can and cannot implement. For example, permissions 116 can indicate that user profile 114 is allowed to see an error code generated by a storage volume and that the user profile 114 is not allowed to see error tracing information related to storage management software controlling the storage volume insofar as the storage management software is proprietary. As another example, permissions 116 can include an indication that the user profile 114 is authorized to perform software and firmware updates to malfunctioning component 102 and that the user profile 114 is not authorized to change configuration settings of the malfunctioning component 102.

User device 104 can receive the error documentation 112 and can then provide the error documentation 112 to the server 106. The server 106 can compare the error documentation 112 against a troubleshooting repository 118 and/or a solutions repository 126. Based on the comparison, server 106 can generate one or more of a diagnostic plan 120 based on the troubleshooting repository 118 and/or an error resolution plan 128 based on the solutions repository 126. In some embodiments, the malfunctioning component 102 may be experiencing a relatively straightforward error, and in such embodiments, the server 106 can generate an error resolution plan 128 indicating a solution (e.g., that a certain firmware upgrade should be implemented). In other embodiments, the malfunctioning component 102 may be experiencing a relatively complex error, and in such embodiments, the server 106 can first generate a diagnostic plan 120 instructing additional information that should be gathered from the malfunctioning component 102 using one or more diagnostic tools 108 which can improve the probability of the server 106 accurately identifying an error resolution plan 128.

Both troubleshooting repository 118 and solutions repository 126 can utilize any suitable algorithms useful for expediently and correctly generating a diagnostic plan 120 and/or an error resolution plan 128. As one example, troubleshooting repository 118 and solutions repository 126 can perform database matching, where respective diagnostic plans 120 in a database of diagnostic plans in troubleshooting repository 118, and respective error resolution plans 128 in a database of error resolution plans in solutions repository 126 are each associated with certain error documentation. In such embodiments, server 106 can utilize a matching algorithm to match error documentation 112 to a corresponding diagnostic plan 120 and/or error resolution plan 128. Where error documentation 112 contains insufficient information for matching to an error resolution plan 128, the error documentation 112 can be used to match to a diagnostic plan 120 which, once implemented, generates additional diagnostic information to add to error documentation 112 that, when taken together, can be sufficient to match to a certain error resolution plan 128. Thus, in such embodiments, diagnostic plan 120 can be useful for relatively sparse, generic, or ambiguous information in error documentation 112, whereas error resolution plan 128 can be useful for relatively useful for robust, unique, or specific error documentation 112.

Database matching is but one of many possible implementations of various embodiments of the present disclosure. Another example relates to machine learning or deep learning, where algorithms or models can be generated by performing supervised, unsupervised, or semi-supervised training on a dataset, and subsequently applying the generated algorithm or model to predict an appropriate diagnostic plan 120 and/or error resolution plan 128 for a given error documentation 112.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Regardless of the techniques utilized by server 106 to generate troubleshooting repository 118 and solutions repository 126 and subsequently generate a diagnostic plan 120 and an error resolution plan 128 based on the error documentation 112, the server 106 can provide the diagnostic plan 120 and/or the error resolution plan 128 to the user device 104.

In the event that the server 106 provides diagnostic plan 120 to the user device 104, then the user device 104 can implement the diagnostic plan 120 by utilizing at least one diagnostic tool 108 defined in the diagnostic plan 120, and implementing the diagnostic tool 108 to evaluate the malfunctioning component 102. Diagnostic tool 108 can include, for example, partitioning agents, system performance benchmarks, disk cloning tools, disk imaging tools, data recovery tools, Master Boot Record (MBR) tools, BIOS tools, rootkit detectors, anti-malware detectors, defragmentation utilities (e.g., Contig, PageDefrag, etc.), bus snooping tools, log analysis tools, return code analysis tools, feature license tools, and/or other tools, kits, utilities, and/or functionalities useful for gathering information from a computational system.

Some non-limiting examples of diagnostic tool 108 include, for example, Windows® Sysinternals Suite, System Explorer, SIW (System Information for Windows®), HWiNFO, Speccy®, hddscan, Hiren's BootCD, Ubuntu® Live CD, Ultimate Boot CD for Windows® (UBCD4Win), Lenovo® Diagnostic Solutions, HP® PC Hardware Diagnostics, Dell® SupportAssist, and/or other software-focused or hardware-focused diagnostic tools 108 that can be in the form of software, hardware, or software together with hardware.

Implementing diagnostic tool 108 on malfunctioning component 102 generates diagnostic output 122. Diagnostic output 122 is modified according to permissions 116 of user profile 114 to generate censored diagnostic output 124, where the censored diagnostic output 124 includes missing, deleted, redacted, covered, hidden, scrambled, anonymized, or otherwise removed information that is not within permissions 116 of user profile 114. The removed information can be related to proprietary content, export-controlled content, privacy-controlled content, or other content.

Diagnostic tool 108 can provide the censored diagnostic output 124 to the user device 104. User device 104 can then provide the censored diagnostic output 124 and the error documentation 112 to server 106, and the server 106 can determine another diagnostic plan 120 or an error resolution plan 128 based on the error documentation 112 together with the censored diagnostic output 124. Censored diagnostic output 124 can be generated at diagnostic tool 108, user device 104, or server 106. Regardless of where it is generated, only censored diagnostic output 124 is presented to a user interface associated with user device 104. In some embodiments, diagnostic output 122 is received at either user device 104 or server 106 and the diagnostic output 122 is used to generate censored diagnostic output 124 according to permissions 116. In some embodiments, censored diagnostic output 124 is then saved to user device 104 and/or server 106 and the diagnostic output 122 is then deleted from user device 104 and/or server 106.

In embodiments where the server 106 requests additional information by an updated diagnostic plan 120, the server 106, user device 104, and one or more diagnostic tools 108 can interact as previously described until enough information is gathered to determine an error resolution plan 128. In some embodiments, this can include obtaining a correct product license or feature license in order to enable certain functionalities on malfunctioning component 102, utilize or access additional diagnostic tools 108, or interpret output from malfunctioning component 102 or diagnostic tools 108.

Error resolution plan 128 is then transmitted to user device 104. In various embodiments, user device 104 can implement or transmit the error resolution plan 128 according to permissions 116. As one example, where the user device 104 is associated with administrator level permissions 116, the user device 104 can implement the error resolution plan 128 on the malfunctioning component 102. Implementing the error resolution plan 128 can include, for example, installing or uninstalling software or firmware, updating existing software or firmware, modifying configuration settings, resetting configuration settings, rebooting, applying defragmentation utilities, applying malware removal utilities, and/or implementing other techniques or protocols that can be useful for restoring a malfunctioning component 102 to functionality.

FIG. 1 is shown for illustrative purposes and is not limiting. For example, user device 104 and server 106 can be incorporated into a same physical device. Further, in some embodiments, diagnostic tool 108 is incorporated into one or more of user device 104, malfunctioning component 102 and/or server 106. Further, although a single network 110 is shown, in some embodiments, numerous types of networks can be used to continuously or intermittently couple the various components shown in FIG. 1. Network 110 is purely for illustrative purposes, and network 110 can represent any number of wired or wireless networks now known or later developed.

Figure 2:
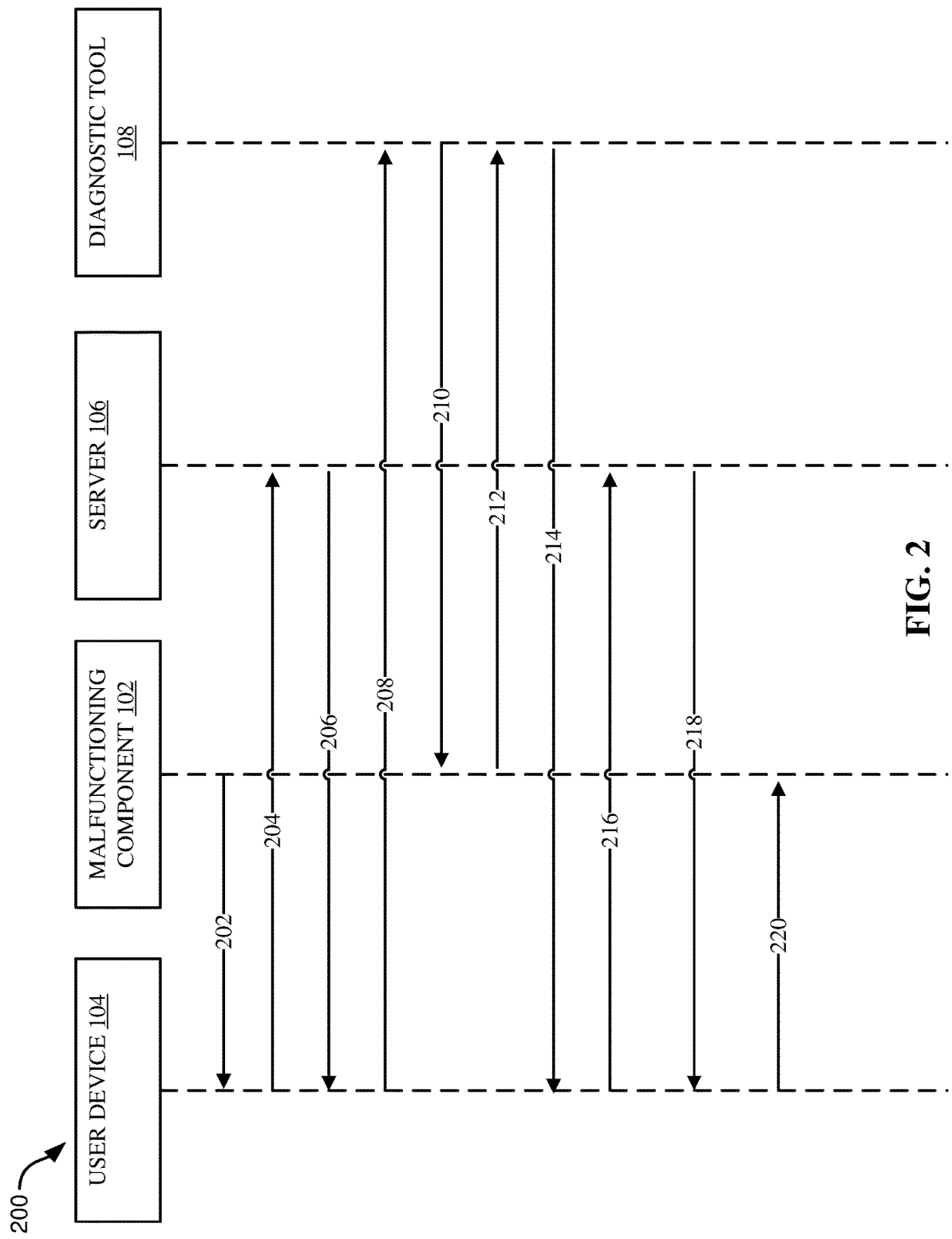
FIG. 2 illustrates a first example communication diagram for resolving system errors, in accordance with some embodiments of the present disclosure.

Referring now to FIG. 2, illustrated is an interaction diagram 200 illustrating some embodiments of the present disclosure. As shown in FIG. 2, malfunctioning component 102 can provide error documentation 112 to user device 104 at interaction 202. User device 104 can transmit the error documentation 112 to the server 106 at interaction 204. Server 106 can provide diagnostic plan 120 to user device 104 at interaction 206. User device 104 can call a diagnostic tool 108 defined in the diagnostic plan 120 at interaction 208. The called diagnostic tool 108 can interact with malfunctioning component 102 at interaction 210. The malfunctioning component 102 can provide diagnostic output 122 to diagnostic tool 108 at interaction 212. The diagnostic tool 108 can provide censored diagnostic output 124 to user device 104 at interaction 214, where the censored diagnostic output 124 can be censored according to permissions 116 in user profile 114. The user device 104 can transmit censored diagnostic output 124 to server 106 at interaction 216. The server 106, in the event it has sufficient information to generate an error resolution plan 128, transmits an error resolution plan 128 to the user device 104 at interaction 218. In some embodiments, the user device 104 implements the error resolution plan 128 on the malfunctioning component 102 at interaction 220.

Several variations of the interaction diagram 200 exist. As one example, at interaction 212, the diagnostic tool 108 can receive censored diagnostic output 124 rather than diagnostic output 122. In these embodiments, the diagnostic plan 120 can include parameters for diagnostic tool 108 such that when diagnostic tool 108 interfaces with malfunctioning component 102 at interaction 210, only censored diagnostic output 124 is received at diagnostic tool 108 at interaction 212.

As another example variation, diagnostic tool 108 can transmit the diagnostic output 122 to the user device 104 at interaction 214, and the user device 104 can then generate censored diagnostic output 124 from the diagnostic output 122.

Figure 3:
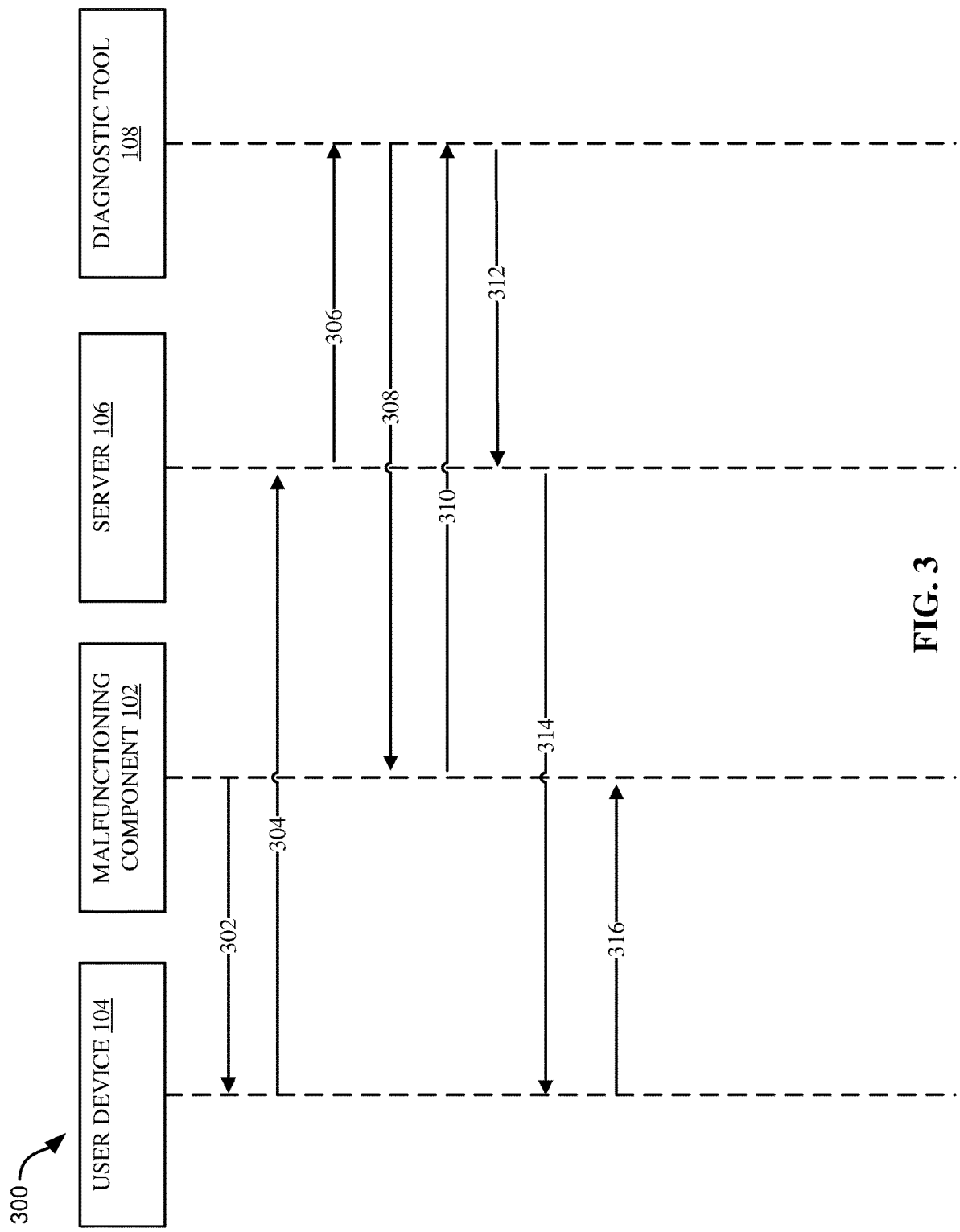
FIG. 3 illustrates a second example communication diagram for resolving system errors, in accordance with some embodiments of the present disclosure.

Referring now to FIG. 3, illustrated is another interaction diagram 300 illustrating some embodiments of the present disclosure. As shown in FIG. 3, malfunctioning component 102 can provide error documentation 112 to user device 104 at interaction 302. User device 104 can transmit the error documentation 112 to the server 106 at interaction 304. The server 106 can call a diagnostic tool 108 based on a diagnostic plan 120 generated by the server 106 at interaction 306. The diagnostic tool 108 can implement diagnostics on malfunctioning component 102 at interaction 308. The malfunctioning component 102 can provide diagnostic output 122 to the diagnostic tool 108 at interaction 310. The diagnostic tool 108 can transmit censored diagnostic output 124 to the server 106 at interaction 312, where the censored diagnostic output 124 is censored according to permissions 116 associated with user profile 114 of user device 104. The server 106 can use the censored diagnostic output 124 together with the error documentation 112 to generate an error resolution plan 128 and can send the error resolution plan 128 to the user device 104 at interaction 314. In some embodiments, the user device 104 can implement the error resolution plan 128 on the malfunctioning component 102 at interaction 316.

The example variations discussed above with respect to FIG. 2 are also relevant to FIG. 3. For example, the diagnostic tool 108 can receive censored diagnostic output 124 at interaction 310, where the diagnostic plan 120 is configured to cause the diagnostic tool 108 to retrieve only censored diagnostic output 124. As another example variation, diagnostic tool 108 can provide diagnostic output 122 to server 106 at interaction 312, and server 106 can then generate censored diagnostic output 124 which can be sent to user device 104 together with error resolution plan 128 at interaction 314.

Figure 4:
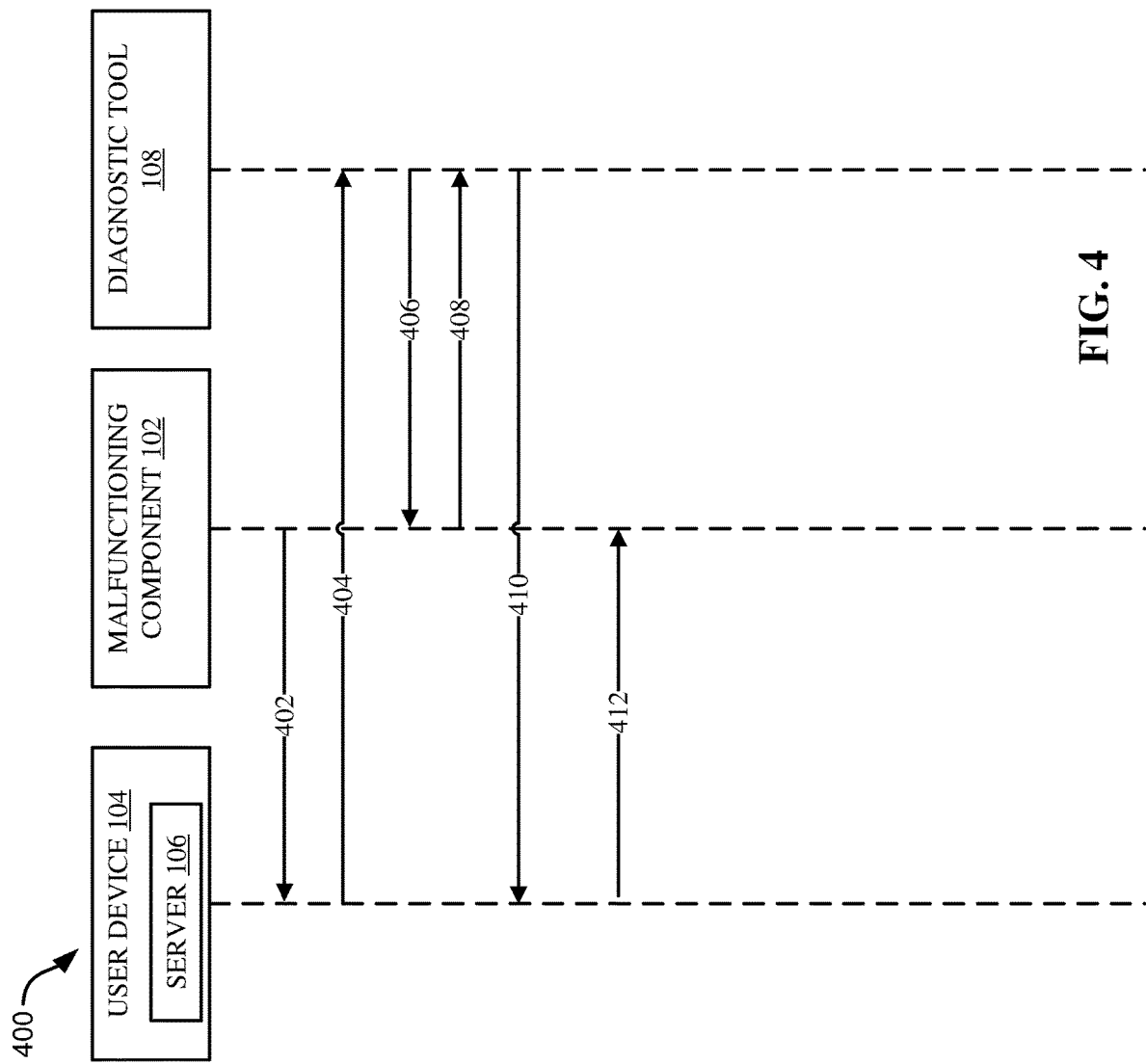
FIG. 4 illustrates a third example communication diagram for resolving system errors, in accordance with some embodiments of the present disclosure.

Referring now to FIG. 4, illustrated is another interaction diagram 400 illustrating some embodiments of the present disclosure where user device 104 and server 106 are incorporated into one another. As shown in FIG. 4, malfunctioning component 102 can provide error documentation 112 to user device 104 at interaction 402. User device 104 can generate a diagnostic plan 120 based on the error documentation 112 and can then call a diagnostic tool 108 according to diagnostic plan 120 at interaction 404. The diagnostic tool 108 can execute a diagnostic process on malfunctioning component 102 at interaction 406. The malfunctioning component 102 can issue diagnostic output 122 to diagnostic tool 108 at interaction 408. The diagnostic tool 108 can provide censored diagnostic output 124 to user device 104 at interaction 410. The user device 104 can generate an error resolution plan 128 based on the censored diagnostic output 124 and the error documentation 112 and, in some embodiments, implement the error resolution plan 128 on the malfunctioning component 102 at interaction 412.

The example variations discussed above with respect to FIGS. 2 and 3 are also relevant to FIG. 4. For example, in some embodiments, the diagnostic tool 108 receives censored diagnostic output 124 at interaction 408, where the diagnostic plan 120 is configured to cause the diagnostic tool 108 to only generate censored diagnostic output 124. As another example, diagnostic tool 108 can provide diagnostic output 122 to user device 104 at interaction 410, and the user device 104, together with server 106, can generate censored diagnostic output 124 based on the diagnostic output 122 and delete the diagnostic output 122 after saving the censored diagnostic output 124.

Figure 5:
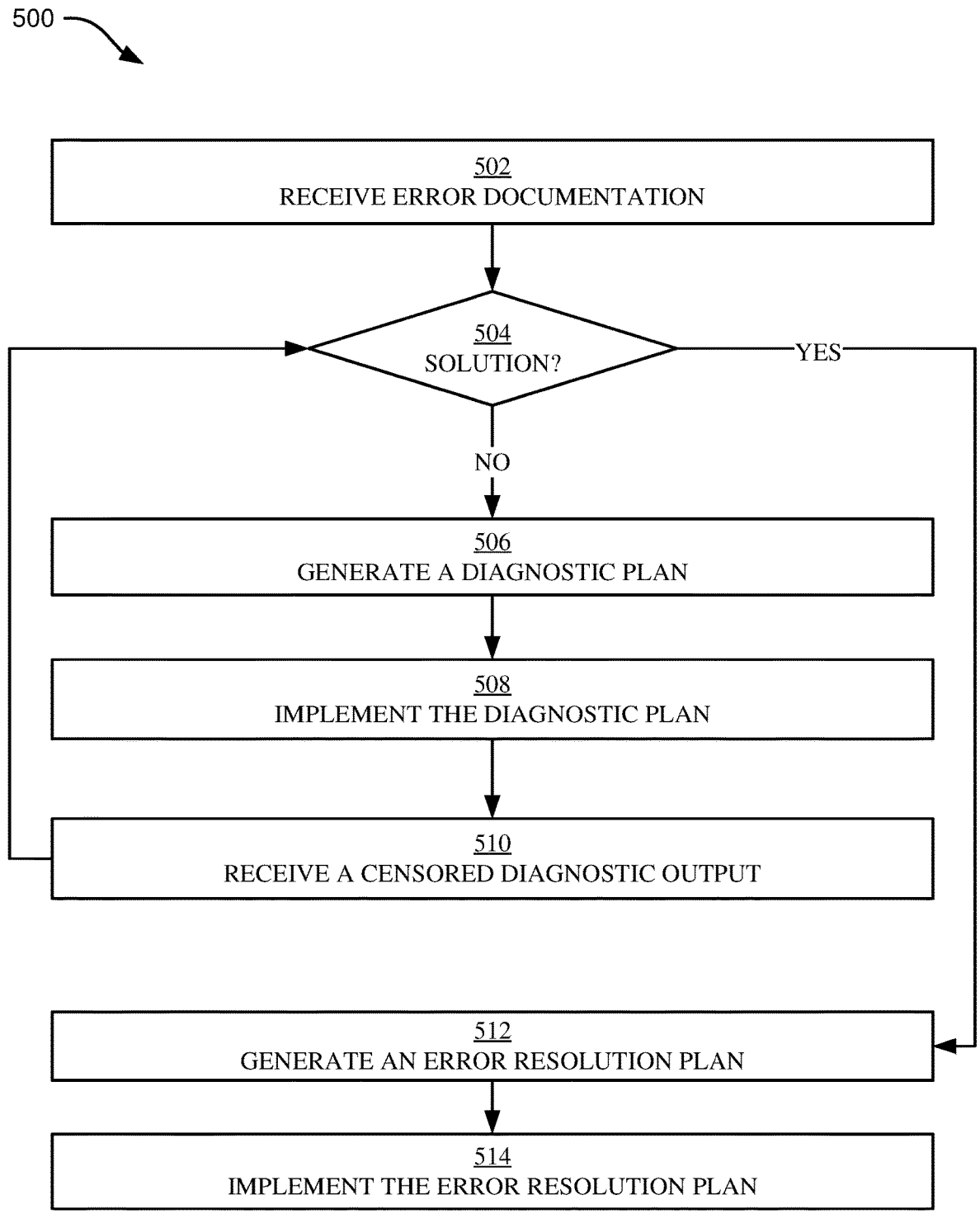
FIG. 5 illustrates a flowchart of an example method for generating a diagnostic plan and an error resolution plan, in accordance with some embodiments of the present disclosure.

Referring now to FIG. 5, illustrated is a flowchart of an example method 500 for generating and implementing a diagnostic plan 120 and an error resolution plan 128, in accordance with some embodiments of the present disclosure. In some embodiments, the method 500 is implemented by a server 106 or a different configuration of hardware and/or software.

In operation 502, the server 106 receives error documentation 112. The error documentation can be received from a user device 104 and the error documentation 112 can be related to an error on a malfunctioning component 102.

In operation 504, the server 106 determines if there is a known error resolution plan 128 by utilizing the information stored in the error documentation 112 and the information stored in a solutions repository 126. If there is a known error resolution plan 128, then the method 500 proceeds to operation 512 (discussed hereinafter). If there is no known error resolution plan 128, then the method 500 proceeds to operation 506 and generates a diagnostic plan 120 according to a troubleshooting repository 118.

In operation 508, the server 106 implements the diagnostic plan 120. The server 106 can implement the diagnostic plan 120 by transmitting the diagnostic plan 120 to the user device 104 or by directly calling a diagnostic tool 108 according to the diagnostic plan 120.

In operation 510, the server 106 receives a censored diagnostic output 124 from a diagnostic tool 108 identified in the diagnostic plan 120. The censored diagnostic output 124 can have proprietary, confidential, or otherwise private information from diagnostic output 122 removed based on permissions 116 associated with user profile 114 of user device 104. In some embodiments, operation 510 receives diagnostic output 122 and generates censored diagnostic output 124 based on permissions 116 in user profile 114.

The method 500 returns to operation 504 to determine if there is an error resolution plan 128 that is determinable from the error documentation 112 together with the censored diagnostic output 124. If not (504: NO), the method 500 proceeds again through operations 506-510 to collect additional diagnostic information. If so (504: YES), the method 500 proceeds to operation 512.

In operation 512, the server 106 generates an error resolution plan 128 based on the error documentation 112 and the censored diagnostic output 124. In operation 514, the server 106 implements the error resolution plan 128. In some embodiments, implementing the error resolution plan 128 includes transmitting the error resolution plan 128 to the user device 104. In some embodiments, implementing the error resolution plan 128 includes executing one or more fixes on the malfunctioning component 102.

Figure 6:
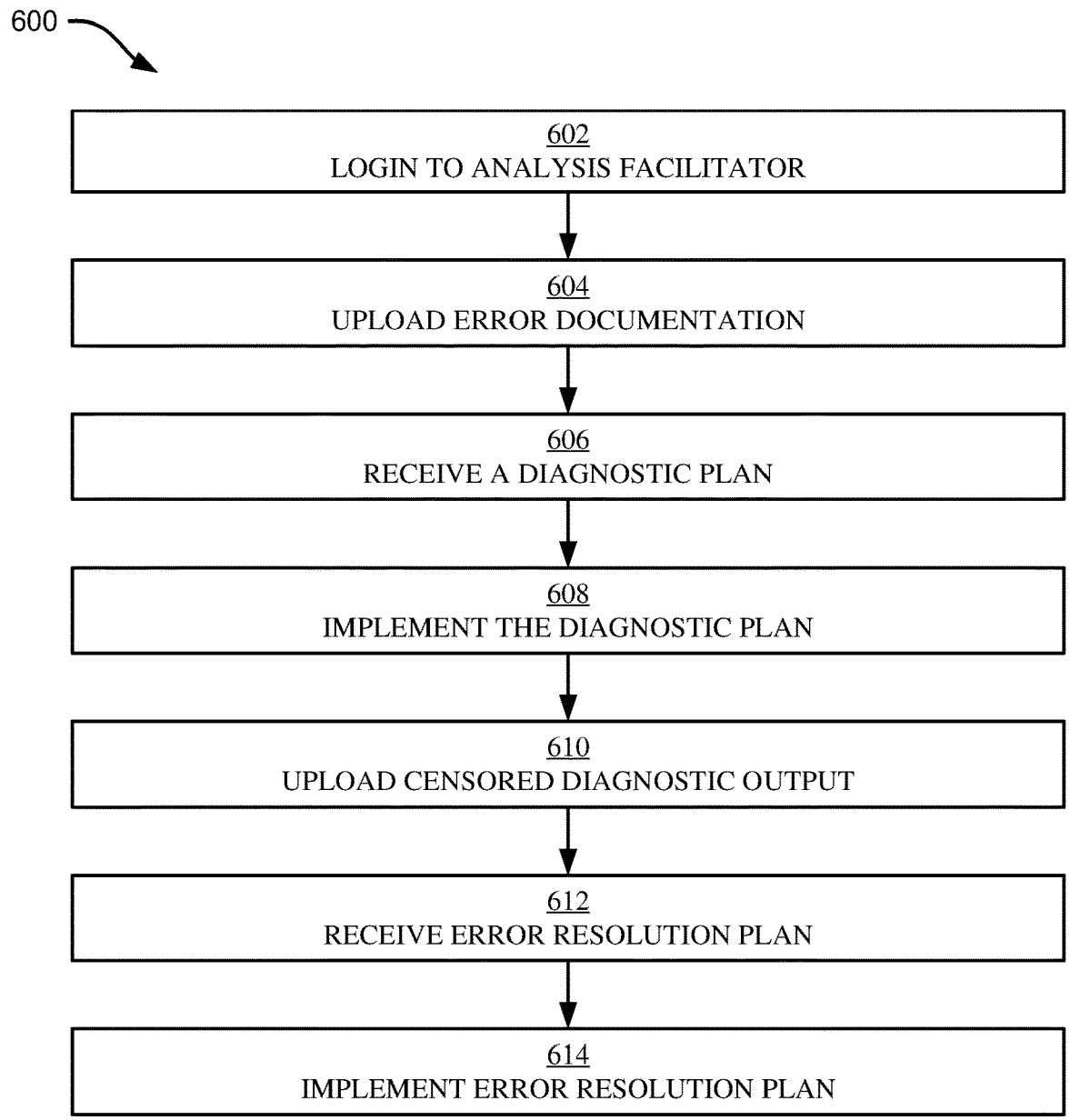
FIG. 6 illustrates a flowchart of an example method for utilizing analysis facilitator functionality at a user device, in accordance with some embodiments of the present disclosure.

Referring now to FIG. 6, illustrated is a flowchart of an example method 600 for resolving system errors using an analysis facilitator application, in accordance with some embodiments of the present disclosure. In some embodiments, the method 600 can be performed by a user device 104 or a different configuration of hardware and/or software.

In operation 602, the user device 104 can be used to login to a user profile 114 associated with an analysis facilitator application. Operation 602 can include receiving login information at the user device 104 from a user. Login information can include an identifier (e.g., email, username, employee number, etc.) and a password (e.g., an alphanumeric password, a biometric password, etc.). Operation 602 can result in user profile 114 (with its associated permissions 116) being loaded onto the user device 104.

In operation 604, the user device 104 can be used to upload error documentation 112 from a malfunctioning component 102 to a server 106. The user device 104 can automatically receive the error documentation 112 from the malfunctioning component 102, or the user device 104 can retrieve the error documentation 112 from the malfunctioning component 102 by issuing a command, query, or other message to the malfunctioning component 102.

In operation 606, the user device 104 receives a diagnostic plan 120 from the server 106. The diagnostic plan 120 can include, for example, identification of a diagnostic tool 108 to execute on the malfunctioning component 102 to collect additional information related to the malfunctioning component 102.

In operation 608, the user device 104 can implement the diagnostic plan 120 by executing a diagnostic tool 108 against the malfunctioning component 102. In some embodiments, operation 608 includes downloading functionality related to the diagnostic tool 108. In some embodiments, operation 608 includes receiving user input related to a level of detail associated with implementing the diagnostic tool 108. For example, user device 104 can present an interface allowing the user to select between a version of the diagnostic tool 108 that retrieves and presents both non-confidential and confidential information, and another version of the diagnostic tool 108 that retrieves and presents only non-confidential information. In some embodiments, there are additional levels of granularity associated with each version of the diagnostic tool 108. Further, in some embodiments, some versions of the diagnostic tool 108 are not visible, or if they are visible, are grayed-out or otherwise inexecutable. In such embodiments, invisible or inexecutable versions of the diagnostic tool 108 can be determined as such based on permissions 116 of user profile 114. Operation 608 can further include receiving the censored diagnostic output 124 from the diagnostic tool 108, where the censored diagnostic output 124 has information removed according to the permissions 116 of the user profile 114.

In operation 610, the user device 104 uploads censored diagnostic output 124 to the server 106. In operation 612, the user device 104 receives an error resolution plan 128 from the server 106. The error resolution plan 128 can include steps for resolving the error on malfunctioning component 102.

In operation 614, the user device 104 can implement the error resolution plan 128. In some embodiments, implementing the error resolution plan 128 includes transmitting the error resolution plan 128 to an administrator of the malfunctioning component 102. In other embodiments, implementing the error resolution plan 128 includes executing the error resolution plan 128 on the malfunctioning component 102 to resolve the error.

Figure 7:
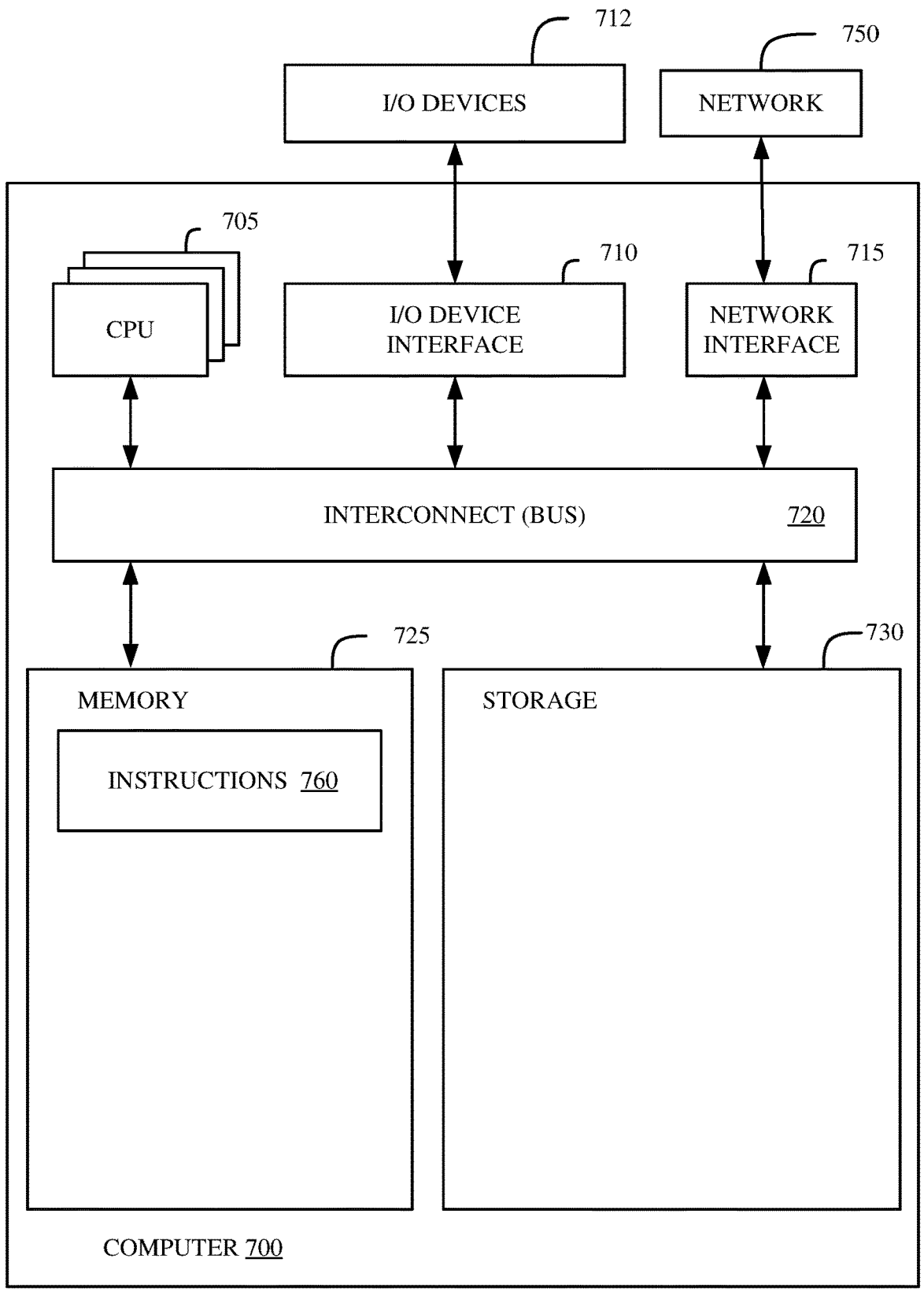
FIG. 7 illustrates a block diagram of an example computer, in accordance with some embodiments of the present disclosure.

FIG. 7 illustrates a block diagram of an example computer 700 in accordance with some embodiments of the present disclosure. In various embodiments, computer 700 can perform the methods described in FIGS. 2-6 and/or implement the functionality discussed in FIG. 1. In some embodiments, computer 700 receives instructions related to the aforementioned methods and functionalities by downloading processor-executable instructions from a remote data processing system via network 750. In other embodiments, computer 700 provides instructions for the aforementioned methods and/or functionalities to a client machine such that the client machine executes the method, or a portion of the method, based on the instructions provided by computer 700. In some embodiments, the computer 700 is incorporated into one or more of the malfunctioning component 102, the user device 104, the server 106, and/or the diagnostic tool 108.

Computer 700 includes memory 725, storage 730, interconnect 720 (e.g., BUS), one or more CPUs 705 (also referred to as processors herein), I/O device interface 710, I/O devices 712, and network interface 715.

Each CPU 705 retrieves and executes programming instructions stored in memory 725 or storage 730. Interconnect 720 is used to move data, such as programming instructions, between the CPUs 705, I/O device interface 710, storage 730, network interface 715, and memory 725. Interconnect 720 can be implemented using one or more busses. CPUs 705 can be a single CPU, multiple CPUs, or a single CPU having multiple processing cores in various embodiments. In some embodiments, CPU 705 can be a digital signal processor (DSP). In some embodiments, CPU 705 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 725 is generally included to be representative of a random-access memory (e.g., static random-access memory (SRAM), dynamic random access memory (DRAM), or Flash). Storage 730 is generally included to be representative of a non-volatile memory, such as a hard disk drive, solid state device (SSD), removable memory cards, optical storage, or flash memory devices. In an alternative embodiment, storage 730 can be replaced by storage area-network (SAN) devices, the cloud, or other devices connected to computer 700 via I/O device interface 710 or network 750 via network interface 715.

In some embodiments, memory 725 stores instructions 760. However, in various embodiments, instructions 760 are stored partially in memory 725 and partially in storage 730, or they are stored entirely in memory 725 or entirely in storage 730, or they are accessed over network 750 via network interface 715.

Instructions 760 can be processor-executable instructions for performing any portion of, or all of, any of the methods of FIGS. 2-6 and/or implementing any of the functionality discussed in FIG. 1.

In various embodiments, I/O devices 712 include an interface capable of presenting information and receiving input. For example, I/O devices 712 can present information to a user interacting with computer 700 and receive input from the user.

Computer 700 is connected to network 750 via network interface 715. Network 750 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
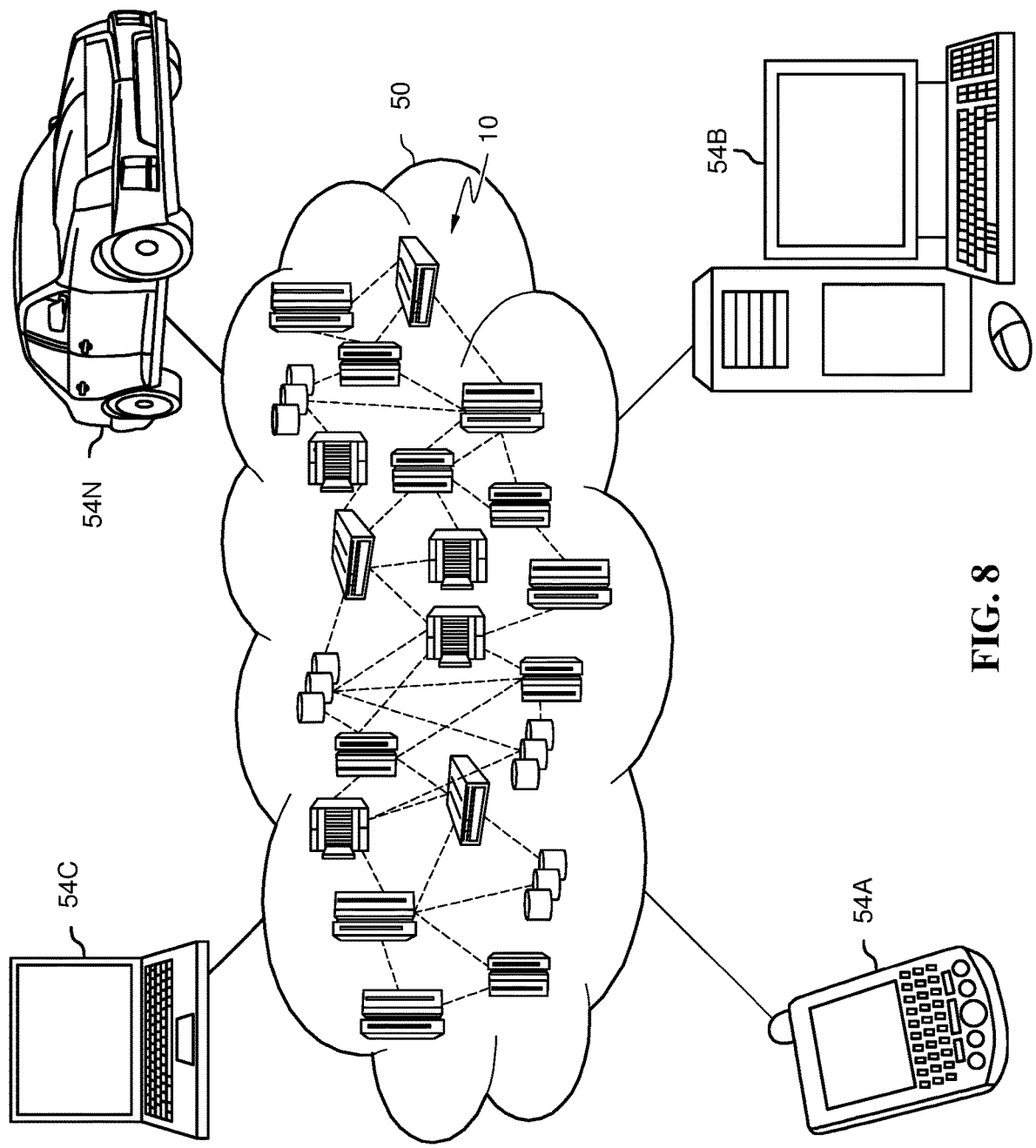
FIG. 8 depicts a cloud computing environment, in accordance with some embodiments of the present disclosure.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
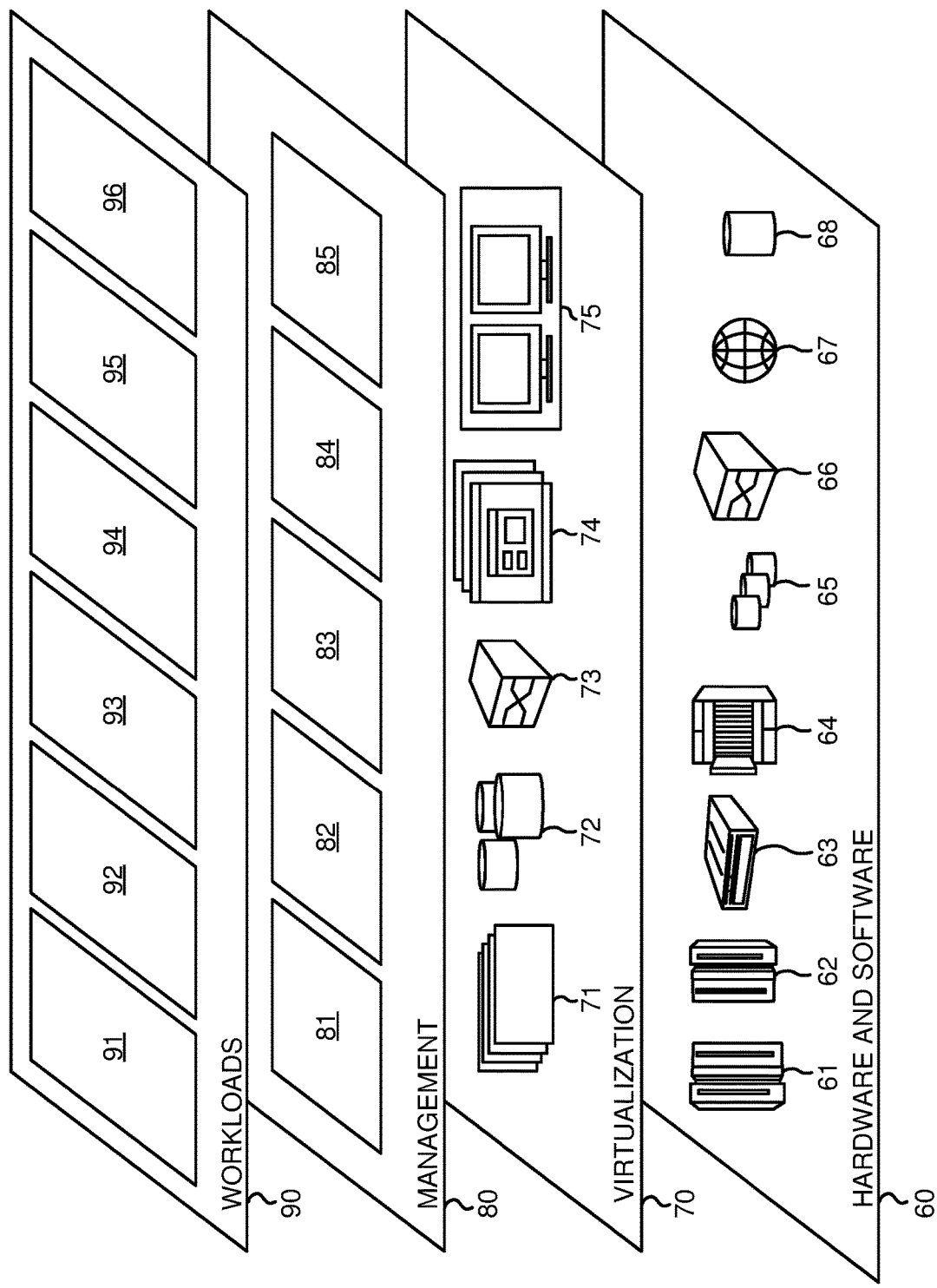
FIG. 9 depicts abstraction model layers, in accordance with some embodiments of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and analysis facilitator processing 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 760 of FIG. 7 and/or any software configured to perform any subset of the methods described with respect to FIGS. 2-6 and/or any of the functionality discussed in FIG. 1) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A brief discussion of various examples of the present disclosure will now be discussed. Although a method is described below, other embodiments of the present disclosure including systems and computer program products configured to implement the methods described below.

A first example relates to a computer-implemented method comprising receiving error documentation related to a system having a plurality of hardware components and a plurality of software components, wherein the error documentation is received from a user device associated with a user profile, the user profile having permissions. The method further comprising generating a diagnostic plan including a diagnostic tool based on the error documentation. The method further comprising implementing the diagnostic tool on at least one component selected from a group consisting of: the plurality of hardware components, and the plurality of software components of the system. The method further comprising receiving censored diagnostic output in response to implementing the diagnostic tool, wherein the censored diagnostic output is censored according to the defined permissions of the user profile. The method further comprising generating an error resolution plan based on the censored diagnostic output and the error documentation.

A second example including the limitations of the first example further comprises transmitting the error resolution plan to the user device for presentation on an interface of the user device.

A third example including the limitations of the first or second example further comprises executing the error resolution plan on at least one component selected from a group consisting of: the plurality of hardware components, and the plurality of software components.

A fourth example including the limitations of one or more of the first through third examples further comprises matching the error documentation to predetermined error documentation associated with the diagnostic plan in a database of diagnostic plans, and selecting the diagnostic plan in response to matching the error documentation to the predetermined error documentation.

A fifth example including the limitations of the fourth example further includes wherein the database of diagnostic plans includes error documentation related to servers, storage volumes, computers, processors, and routers from a variety of vendors, and wherein the diagnostic tool is a vendor-specific diagnostic tool.

A sixth example including the limitations of one or more of the first through fifth examples further includes inputting the error documentation to a model, and outputting, from the model, the diagnostic plan.

A seventh example including the limitations of the sixth example further includes wherein the model is a machine learning model.

An eighth example including the limitations of the sixth example further includes wherein the model is a neural network.

A ninth example including the limitations of one or more of the first through eighth examples further includes receiving diagnostic output in response to implementing the diagnostic tool, censoring the diagnostic output according to the defined permissions of the user profile to generate censored diagnostic output, saving the censored diagnostic output, and deleting the diagnostic output.

A tenth example including the limitations of the ninth example further includes wherein the defined permissions include informational permissions and executable permissions, wherein informational permissions define diagnostic output information that is censored, wherein the executable permissions define executable operations implementable on the system by the user profile.

What is claimed is:
1. A computer-implemented method comprising:
receiving error documentation related to a system having a plurality of hardware components and a plurality of software components, wherein the error documentation is received from a user device associated with a user profile, the user profile including permissions;
generating a diagnostic plan including a diagnostic tool based on the error documentation by:
matching the error documentation to predetermined error documentation associated with the diagnostic plan in a database of diagnostic plans, wherein the database of diagnostic plans includes error documentation related to servers, storage volumes, computers, processors, and routers from a variety of vendors, and wherein the diagnostic tool is a vendor-specific diagnostic tool; and
selecting the diagnostic plan in response to matching the error documentation to the predetermined error documentation;
implementing the diagnostic tool on at least one component selected from a group consisting of: the plurality of hardware components, and the plurality of software components;
receiving censored diagnostic output in response to implementing the diagnostic tool, wherein the censored diagnostic output is censored according to the permissions of the user profile; and
generating an error resolution plan based on the censored diagnostic output and the error documentation.
2. The method of claim 1, further comprising:
transmitting the error resolution plan to the user device for presentation on an interface of the user device.
3. The method of claim 1, further comprising:
executing the error resolution plan on at least component selected from a group consisting of: the plurality of hardware components, and the plurality of software components.
4. The method of claim 1, wherein generating the diagnostic plan further comprises:
inputting the error documentation to a model; and
outputting, from the model, the diagnostic plan.
5. The method of claim 4, wherein the model is a machine learning model.
6. The method of claim 4, wherein the model is a neural network.

7. The method of claim 1, wherein receiving the censored diagnostic output further comprises:
- receiving a diagnostic output in response to implementing the diagnostic tool;
- censoring the diagnostic output according to the permissions of the user profile to generate the censored diagnostic output, wherein censoring the diagnostic output includes redacting a first portion of the diagnostic output and anonymizing a second portion of the diagnostic output;
- saving the censored diagnostic output; and
- deleting the diagnostic output.

8. The method of claim 7, wherein the permissions include informational permissions and executable permissions, wherein informational permissions define diagnostic output information that is censored, wherein the executable permissions define executable operations implementable on the system by the user profile.

9. A computer program product comprising a computer readable storage medium having program instructions embodied therewith, the program instructions executable by a processor to cause the processor to perform a method comprising:
- receiving error documentation related to a system having a plurality of hardware components and a plurality of software components, wherein the error documentation is received from a user device associated with a user profile, the user profile including permissions;
- generating a diagnostic plan including a diagnostic tool based on the error documentation by:
  - matching the error documentation to predetermined error documentation associated with the diagnostic plan in a database of diagnostic plans, wherein the database of diagnostic plans includes error documentation related to servers, storage volumes, computers, processors, and routers from a variety of vendors, and wherein the diagnostic tool is a vendor-specific diagnostic tool; and
  - selecting the diagnostic plan in response to matching the error documentation to the predetermined error documentation;
- implementing the diagnostic tool on at least one component selected from a group consisting of: the plurality of hardware components, and the plurality of software components;
- receiving censored diagnostic output in response to implementing the diagnostic tool, wherein the censored diagnostic output is censored according to the permissions of the user profile; and
- generating an error resolution plan based on the censored diagnostic output and the error documentation.

10. The computer program product of claim 9, further comprising:
- transmitting the error resolution plan to the user device for presentation on an interface of the user device.

11. The computer program product of claim 9, further comprising:
- executing the error resolution plan on at least one component selected from a group consisting of: the plurality of hardware components, and the plurality of software components.

12. The computer program product of claim 9, wherein generating the diagnostic plan further comprises:
- inputting the error documentation to a model; and
- outputting, from the model, the diagnostic plan.

13. The computer program product of claim 12, wherein the model is a machine learning model.

14. The computer program product of claim 12, wherein the model is a neural network.

15. The computer program product of claim 11, wherein receiving the censored diagnostic output further comprises:
- receiving a diagnostic output in response to implementing the diagnostic tool;
- censoring the diagnostic output according to the permissions of the user profile to generate the censored diagnostic output, wherein censoring the diagnostic output includes redacting a first portion of the diagnostic output and anonymizing a second portion of the diagnostic output, and wherein the permissions include informational permissions and executable permissions, wherein informational permissions define diagnostic output information that is censored, wherein the executable permissions define executable operations implementable on the system by the user profile;
- saving the censored diagnostic output; and
- deleting the diagnostic output.

16. A system comprising:
- a processor; and
- a computer-readable storage medium storing program instructions which, when executed by the processor, are configured to cause the processor to perform a method comprising:
- receiving error documentation related to a system having a plurality of hardware components and a plurality of software components, wherein the error documentation is received from a user device associated with a user profile, the user profile including permissions;
- generating a diagnostic plan including a diagnostic tool based on the error documentation by:
  - matching the error documentation to predetermined error documentation associated with the diagnostic plan in a database of diagnostic plans, wherein the database of diagnostic plans includes error documentation related to servers, storage volumes, computers, processors, and routers from a variety of vendors, and wherein the diagnostic tool is a vendor-specific diagnostic tool; and
  - selecting the diagnostic plan in response to matching the error documentation to the predetermined error documentation;
- implementing the diagnostic tool on at least one component selected from a group consisting of: the plurality of hardware components, and the plurality of software components;
- receiving censored diagnostic output in response to implementing the diagnostic tool, wherein the censored diagnostic output is censored according to the permissions of the user profile; and
- generating an error resolution plan based on the censored diagnostic output and the error documentation.

17. The method of claim 7, wherein the diagnostic output comprises an error code and error tracing information for a storage volume, and wherein the censored diagnostic output redacts the error tracing information such that only the error code is visible.

18. The method of claim 8, wherein the executable permissions allow the user profile to perform software and firmware upgrades to the at least one component, and wherein the executable permissions do not allow the user profile from modifying configuration settings of the at least one component.

19. The computer program product of claim 15, wherein the diagnostic output comprises an error code and error tracing information for a storage volume, and wherein the censored diagnostic output redacts the error tracing information such that only the error code is visible, and wherein the executable permissions allow the user profile to perform software and firmware upgrades to the at least one component, and wherein the executable permissions do not allow the user profile from modifying configuration settings of the at least one component.

20. The system of claim 16, wherein receiving the censored diagnostic output further comprises:
- receiving a diagnostic output in response to implementing the diagnostic tool, wherein the diagnostic output comprises an error code and error tracing information for a storage volume;
- censoring the diagnostic output according to the permissions of the user profile to generate the censored diagnostic output, wherein the censored diagnostic output redacts the error tracing information such that only the error code is visible, and wherein the permissions include informational permissions and executable permissions, wherein the executable permissions allow the user profile to perform software and firmware upgrades to the at least one component, and wherein the executable permissions do not allow the user profile to modify configuration settings of the at least one component;
- saving the censored diagnostic output; and
- deleting the diagnostic output.

\* \* \* \* \*